(12) United States Patent
Ahlström et al.

(10) Patent No.: US 9,398,478 B2
(45) Date of Patent: Jul. 19, 2016

(54) RADIO BASE STATION, RADIO NETWORK NODE AND METHODS THEREIN FOR DETECTING A FAULTY ANTENNA

(75) Inventors: Tobias Ahlström, Ljungsbro (SE); Petter Bergman, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 14/233,577

(22) PCT Filed: Jul. 22, 2011

(86) PCT No.: PCT/SE2011/050963
§ 371 (c)(1),
(2), (4) Date: Mar. 20, 2014

(87) PCT Pub. No.: WO2013/015725
PCT Pub. Date: Jan. 31, 2013

(65) Prior Publication Data
US 2014/0194113 A1   Jul. 10, 2014

(51) Int. Cl.
*H04W 24/08* (2009.01)
*H04B 17/17* (2015.01)
(Continued)

(52) U.S. Cl.
CPC .............. *H04W 24/08* (2013.01); *H04B 17/17* (2015.01); *H04B 17/23* (2015.01); *H04B 17/24* (2015.01); *H04B 17/26* (2015.01); *H04B 17/309* (2015.01)

(58) Field of Classification Search
CPC ........................... H04W 24/08; H04W 76/046
USPC ........ 455/423, 424, 425, 67.11, 67.13, 115.1, 455/115.3
See application file for complete search history.

(56) References Cited

U.S. PATENT DOCUMENTS 6,542,754 B1 *   4/2003   Sayers et al. .................. 455/502
6,594,508 B1 *   7/2003   Ketonen ................. G01R 29/10
455/422.1
(Continued)

FOREIGN PATENT DOCUMENTS

WO         0040050 A1    7/2000
WO      2010124913 A1   11/2010

OTHER PUBLICATIONS
Mueller, C. et al. "A Cell Outage Detection Algorithm Using Neighbor Cell List Reports." Dec. 10, 2008. Berlin. pp. 218-229.
(Continued)

*Primary Examiner* — Cong Tran
(74) *Attorney, Agent, or Firm* — Murphy, Bilak & Homiller, PLLC

(57) ABSTRACT

Embodiments herein relate to a method in a first radio base station (12) for enabling detection of a faulty antenna in a radio communications network. The radio communication network comprises the first radio base station (12) providing radio coverage in a first cell (14), and a second radio base station (13) providing radio coverage in a second cell (15). The first radio base station (12) receives, from at least one user equipment in the first cell (14), a first set of measurement reports over a first period of time. At least some measurement reports are indicating a cell relation between the first cell (14) and the second cell (15). The first radio base station (12) further forms reference statistics of the cell relation between the first cell (14) and the second cell (15) based on the first set of measurement reports. Furthermore, the first radio base station (12) receives, from at least one user equipment in the first cell (14), a second set of measurement reports over a second period of time. The first radio base station (12) then forms current statistics of the cell relation between the first cell (14) and the second cell (15) based on the second set of measurement reports. The first radio base station (12) then compares the current statistics with the reference statistics to enable the detection of a faulty antenna in the first radio base station (12) or the second radio base station (13).

44 Claims, 11 Drawing Sheets

(51) Int. Cl.
  *H04B 17/23* (2015.01)
  *H04B 17/24* (2015.01)
  *H04B 17/26* (2015.01)
  *H04B 17/309* (2015.01)

(56) References Cited

U.S. PATENT DOCUMENTS

| | | | |
|---|---|---|---|
| 8,085,198 B2* | 12/2011 | Ochi | 342/359 |
| 2004/0127261 A1 | 7/2004 | Endress | |
| 2008/0261535 A1 | 10/2008 | Weil et al. | |
| 2009/0117894 A1* | 5/2009 | Kogure | 455/424 |
| 2009/0264119 A1* | 10/2009 | De Pomian | H04W 24/08 455/424 |
| 2010/0041392 A1* | 2/2010 | Hirata | H04W 24/04 455/425 |
| 2010/0214931 A1* | 8/2010 | Wigren | H04B 17/345 370/242 |
| 2010/0222012 A1* | 9/2010 | Shibuya | H04B 1/525 455/79 |

OTHER PUBLICATIONS

Unknown, Author. "3rd Generation Partnership Project; Technical Specification Group Radio Access Network; Evolved Universal Terrestrial Radio Access (E-UTRA); Radio Resource Control (RRC); Protocol specification (Release 9)." 3GPP TS 36.331 V9.7.0. Jun. 2011.

* cited by examiner

RADIO BASE STATION, RADIO NETWORK NODE AND METHODS THEREIN FOR DETECTING A FAULTY ANTENNA

TECHNICAL FIELD

Embodiments herein relate to a radio base station, a radio network node and methods therein. In particular, embodiments herein relate to enabling detection of a faulty antenna in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communications. A radio communications network comprises radio base stations providing radio coverage over at least one respective geographical area forming a cell. User equipments (UE) are served in the cells by the respective radio base station and are communicating with the respective radio base station. The user equipments transmit data over an air or radio interface to the radio base stations in uplink (UL) transmissions and the radio base stations transmit data over an air or radio interface to the user equipments in downlink (DL) transmissions.

Each radio base station may comprise one or more antennas used for communicating in the cell. In any radio communications network, a problem with an antenna causing the antenna not to work properly is a significant cause of performance degradation of the radio communications network. A problem with an antenna may be caused by mechanical failures, faulty installation, storm effects or normal wear and tear, resulting in that the antenna will become misaligned or the antenna gain will degrade. An antenna with a problem may be referred to as a faulty antenna. Today, a faulty antenna may be hard to detect or trouble-shoot, as the communication within the cell served by the radio base station with the faulty antenna will continue to work. However, the performance of the radio communications network will suffer due to e.g. coverage holes, and/or increased interference. In e.g. 3rd Generation Partnership Project (3GPP) LTE today there is no dedicated function for detecting a faulty antenna, except for total loss of an antenna.

SUMMARY

An object of embodiments herein is to provide a mechanism that improves the performance of the radio communications network.

According to an aspect of some embodiments herein the object is achieved by a method in a first radio base station for enabling detection of a faulty antenna in a radio communications network. The radio communication network comprises the first radio base station providing radio coverage in a first cell, and a second radio base station providing radio coverage in a second cell. The first radio base station receives, from at least one user equipment in the first cell, a first set of measurement reports over a first period of time. At least some measurement reports indicate a cell relation between the first cell and the second cell. The first radio base station further forms reference statistics of the cell relation between the first cell and the second cell based on the first set of measurement reports. Furthermore, the first radio base station receives, from at least one user equipment in the first cell, a second set of measurement reports over a second period of time. The first radio base station then forms current statistics of the cell relation between the first cell and the second cell based on the second set of measurement reports. The first radio base station then compares the current statistics with the reference statistics to enable the detection of a faulty antenna in the first radio base station or the second radio base station.

According to an aspect of some embodiments herein the object is achieved by providing a first radio base station for enabling detection of a faulty antenna in the radio communications network. The first radio base station is arranged to provide radio coverage in the first cell, and the second radio base station in the radio communications network is arranged to provide radio coverage in the second cell. The first radio base station comprises at least one antenna providing the radio coverage in the first cell. Furthermore, the first radio base station comprises a receiver configured to receive, from at least one user equipment in the first cell, a first set of measurement reports over a first period of time. The receiver is further configured to receive, from at least one user equipment in the first cell, a second set of measurement reports over a second period of time. At least some measurement reports are indicating a cell relation between the first cell and the second cell. Additionally, the first radio base station comprises a forming circuit configured to form reference statistics of a cell relation between the first cell and the second cell based on the first set of measurement reports. The forming circuit is further configured to form current statistics of the cell relation between the first cell and the second cell based on the second set of measurement reports. The first radio base station further comprises a comparing circuit configured to compare the current statistics with the reference statistics to enable the detection of a faulty antenna in the first radio base station or the second radio base station.

According to an aspect of some embodiments herein the object is achieved by a method in a radio network node, e.g. the second radio base station or an Operation and Maintenance node, for enabling detection of a faulty antenna in the radio communications network. The radio communications network comprises the first radio base station providing radio coverage in the first cell, and the second radio base station providing radio coverage in the second cell. The radio network node receives at least one message from the first radio base station, which at least one message is related to a cell relation between the first cell and the second cell. The radio network node detects that an antenna comprised at the first radio base station or at the second radio base station is a faulty antenna by analysing the received at least one message.

According to an aspect of some embodiments herein the object is achieved by a radio network node for enabling detection of a faulty antenna in the radio communications network. The first radio base station provides radio coverage in the first cell, and the second radio base station provides radio coverage in the second cell. The radio network node comprises a receiving circuit configured to receive at least one message, related to a cell relation between the first cell and the second cell, from the first radio base station. The radio network node comprises a detecting circuit configured to detect that an antenna comprised at the first radio base station or at the second radio base station is a faulty antenna by analysing the received at least one message.

An advantage of embodiments herein is that an average network radio coverage and performance is improved as the antenna that is a faulty antenna is detected in an efficient manner. Also, a reduction in Operation And Maintenance (OAM) cost may be achieved by enabling faster detection and trouble-shooting whenever an antenna becomes a faulty antenna.

BRIEF DESCRIPTION OF THE DRAWINGS

Embodiments will now be described in more detail in relation to the enclosed drawings, in which.

DETAILED DESCRIPTION

Figure 1:
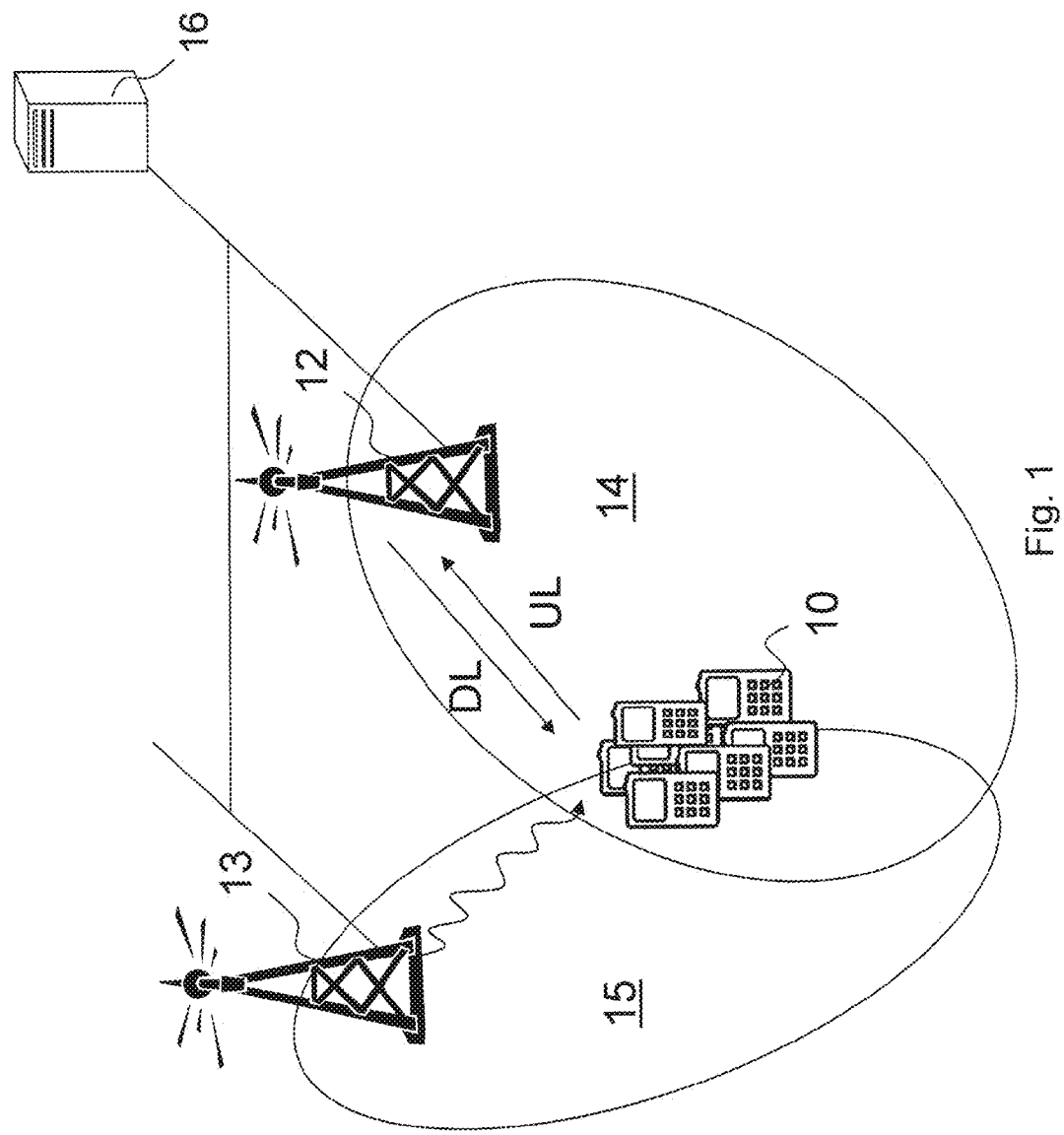
FIG. 1 is a schematic overview of a radio communications network.

FIG. 1 is a schematic overview depicting a radio communications network. In radio communications networks a number of different technologies may be used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. The depicted radio communications network comprises a first radio base station 12 providing radio coverage over at least one geographical area forming a first cell 14. The cell definition may also incorporate frequency bands used for transmissions, which means that two different cells may cover the same geographical area but use different frequency bands. A number of User Equipments (UE) 10 are served in the first cell 14 by the first radio base station 12 and are communicating with the first radio base station 12. The first cell 14 may also be referred to as the serving cell 14. User equipments 10 transmit data over an air or radio interface to the radio base station 12 in uplink (UL) transmissions and the radio base station 12 transmits data over an air or radio interface to the user equipments 10 in downlink (DL) transmissions. Furthermore, a second radio base station 13 serves a second cell 15. The second cell 15 is in the example a neighbor cell to the first cell 14 also referred to as a neighboring cell 15. The first radio base station 12 and the second radio base station 13 are controlled by an Operation and Maintenance (OAM) node 16 and/or a core network node such as an Mobility Management Entity (MME) node in the radio communications network. Each radio base station 12,13 comprises one or more antennas providing the radio coverage in the respective cell 14, 15.

As a part of a mobility function in e.g. a LTE radio access network, each user equipment of the user equipments 10 served by the first cell 14 may continuously measure signal strength and signal quality of the serving cell 14 and the neighbor cell 15. When a certain criterion or criteria e.g. received signal power from the neighbor cell 15 is higher than a defined threshold, or the received signal power from the serving cell 14 is lower than a defined threshold, configured by the first radio base station 12, is fulfilled, a measurement report is sent to the radio base station 12. The measurement report may be sent once, e.g. when an criterion has been fulfilled, or repeatedly, e.g. periodically. The radio base station 12 may then decide whether to start a hand-over attempt to the neighbor cell 15 based on the received measurement report comprising the signal strength and signal quality measurements. These signal strength and signal quality measurements together with other measurements such as signal strength measurements on other Radio Access Technologies (RAT) are also used by an Automatic Neighbor Relations (ANR) function to detect new neighbor cells.

The first radio base station 12 and the second radio base station 13 comprise at least one antenna each. According to embodiments herein the first radio base station 12 may detect whether an antenna is not working properly, also referred to as being a faulty antenna. The first radio base station 12 receives over a first period of time a first set of measurement reports from one or more user equipments in the first cell 14. The measurement reports may e.g. be ANR reports or handover indications. Based on the first set of measurement reports, the first radio base station 12 forms reference statistics, also referred to as reference cell relation statistics. The reference statistics may indicate a normal state of the measurement reports. For example, during day time the first radio base station receives in average 100-200 handover indications to the second cell 15 per hour from user equipments within the first cell 14. At a different time, also referred to as a second period of time, during the day time the first radio base station 12 receives a second set of measurement reports from one or more user equipments in the first cell 14. It should here be noted that the user equipments in the second period of time may be the same or different user equipments than the user equipments in the first period of time. Based on the second set of measurement reports, the first radio base station 12 forms current statistics, also referred to as present cell relation statistics. For example, during a day time hour the radio base station 12 receives a few handover indications to the second cell 15. The first radio base station 12 then compares the current statistics with the reference statistics and based on the comparison an indication whether an antenna of the second radio base station 13 and/or the first radio base station 12 is a faulty antenna is obtained. In some examples below, the first radio base station 12 may, when the indication of the faulty antenna is obtained, then transmit a message, also called a faulty antenna indication, to the second radio base station 13 indicating that a faulty antenna has been detected. The second radio base station 13 may then, by taking into account similar local statistics and/or other indications of a faulty antenna received from other radio base stations, detect that a faulty antenna is comprised in the second radio base station 13. The second radio base station 13 may then, when detected that a faulty antenna is comprised in the second radio base station 13, transmit an alarm message to the OAM node 16 indicating a faulty antenna at the second radio base station 13. The operator receives an alarm at the OAM node 16 and may then try to repair the antenna at the second radio base station 13 indicated by the received alarm.

Figure 2:
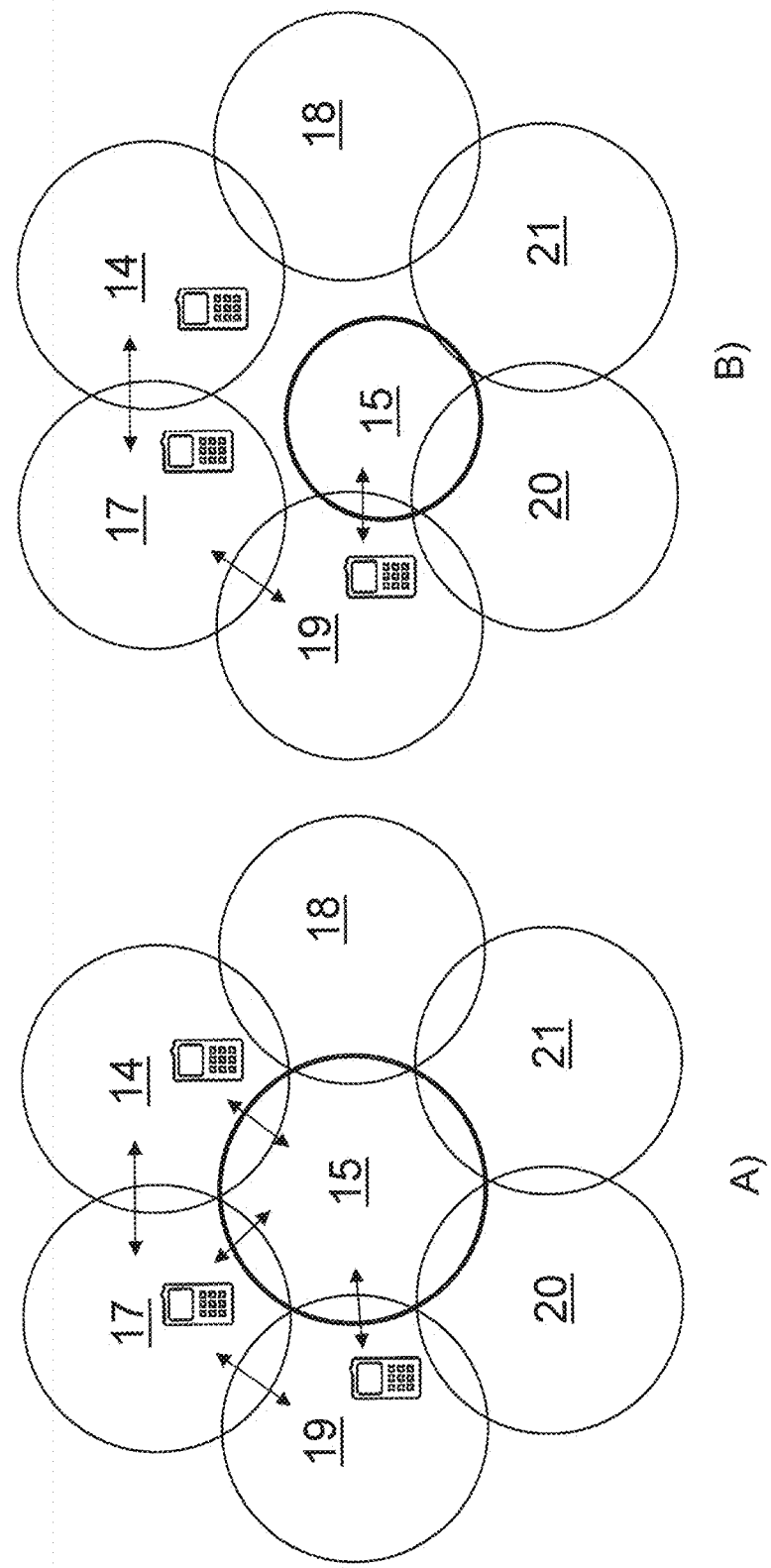
FIGS. 2A-2B are schematic overviews depicting cells in a radio communications network.

FIG. 2A is a schematic overview of a radio communications network. The first cell 14 has a number of neighbor cells, also referred to herein as a number of second cells; the second cell 15, a third cell 17, and a fourth cell 18. Furthermore, the second cell 15 has the above mentioned cells as neighbor cells but also a fifth cell 19, a sixth cell 20, and a seventh cell 21 as neighbor cells. User equipments in the first 14, third 17 and fifth cell 19 transmit measurement reports e.g. ANR reports indicating the second cell 15 as a neighbor cell. Thus, during a first period of time, the first 14 and third 17 and fifth cells 19 are neighbors to the second cell 15. Furthermore, the first cell 14 and the third cell 17 may receive ANR reports of each other's cells, and the third cell 17 and the fifth cell 19 may receive ANR reports of one another's cells.

FIG. 2B is a schematic overview of the radio communications network wherein an antenna of the second radio base station 13 has reduced gain due to getting damaged. The radio coverage of the second cell 15 changes as a result of the changed characteristics of the antenna e.g. so that the second cell becomes smaller, as illustrated. The first cell 14 and the third cell 17 do not receive any or receives only a few ANR reports of the second cell 15, and the second cell 15 does not receive any or receives only a few ANR reports of the first cell 14 and/or the third cell 17, or at least ANR reports where the second cell 15 is not the second best in signal strength.

Thus, the second cell 15, or basically the second radio base station 13, may either send an indication of a faulty antenna, also referred to as a faulty antenna indication, to the first cell 14 and third cell 17, i e to the radio base stations controlling the first and third cell. The second radio base station 13 may additionally or alternatively receive faulty antenna indications from the first cell 14 and the third cell 17. As the second radio base station 13 receives a number of indications of faulty antenna from different cells, the second radio base station 13 may detect that the faulty antenna is comprised in the second radio base station 13 and transmit an alarm message to the OAM node 16 to alarm or notify the operator.

It should further be understood that the first cell 14 and the third cell 17 may receive the indication from the second radio base station 13. But as the respective first and third cell merely receives one faulty antenna indication, the controlling node of the first cell 14, i.e. the first radio base station 12, and the controlling node of the third cell 17 may detect that the faulty antenna is not local but in the second radio base station 13 as all other current statistics are kept intact for the respective first cell 14 and third cell 17. The first radio base station 12 controlling the first cell 14 and the radio base station controlling the third cell 17, may then each transmit a faulty antenna indication to the OAM node 16. In some embodiments, the first radio base station 12 may also be the controlling node of the third cell 17.

Embodiments herein propose a function hosted at a radio base station that utilizes existing UE measurements to produce statistics on different variables of the cell neighbor relations. Such variables of the cell neighbor relation may comprise for example the Common Cell Border Size (CCBS), Extended Common Cell Border Size (ECCBS), and Radio Link Failure (RLF) rate. CCBS and ECCBS are defined in step 802 below. Whenever the variables suddenly change, an heuristic algorithm is applied to detect a possibly faulty antenna in the current cell, or in neighboring cells. If the change indicates a fault in a neighboring cell, a faulty antenna indication, also referred to as an "antenna warning"-message, may be sent over X2 interface to the responsible radio base station, e.g. the second radio base station 13. The second radio base station 13 may then, for a suspected problematic cell, merge or combine the input from own statistics and from incoming faulty antennas indications. Using this merged input the second radio base station 13 may decide to send an alarm message also referred to as a "faulty antenna alarm"-message over Media independent (Mul) interface to an Operation Subsystem (OSS). Antenna faults that embodiments herein are enabled to detect are e.g. reduced antenna gain; changed antenna direction, horizontally; and/or changed antenna tilt, vertically.

When the antenna gain is reduced, the cell area covered shrinks towards the antenna. This will cause e.g. the COBS between cells opposite to the second cell 15, e.g. the first cell 14, the third cell 17 and the fourth cell 18, and the cell where the antenna is providing radio coverage, e g the second cell 15, to shrink compared to the COBS between the cells adjacent to the second cell 15, e.g. fifth cell 19, sixth cell 20 and seventh cell 21, and the second cell 15. COBS is a measure corresponding to a size of a border area between two cells and is defined in step 802 below. Thus, for the first cell 14, the COBS for the second cell 15 causing the problem will shrink, compared to the COBS for other neighbors, e g fifth cell 19. In similar ways a changed antenna direction and changed antenna tilt may be detected. Also other statistics, e.g. RLF for the cell, average signal power at common cell border and average Signal to Interference plus Noise Rate (SINR) at common cell border may be used.

Figure 3:
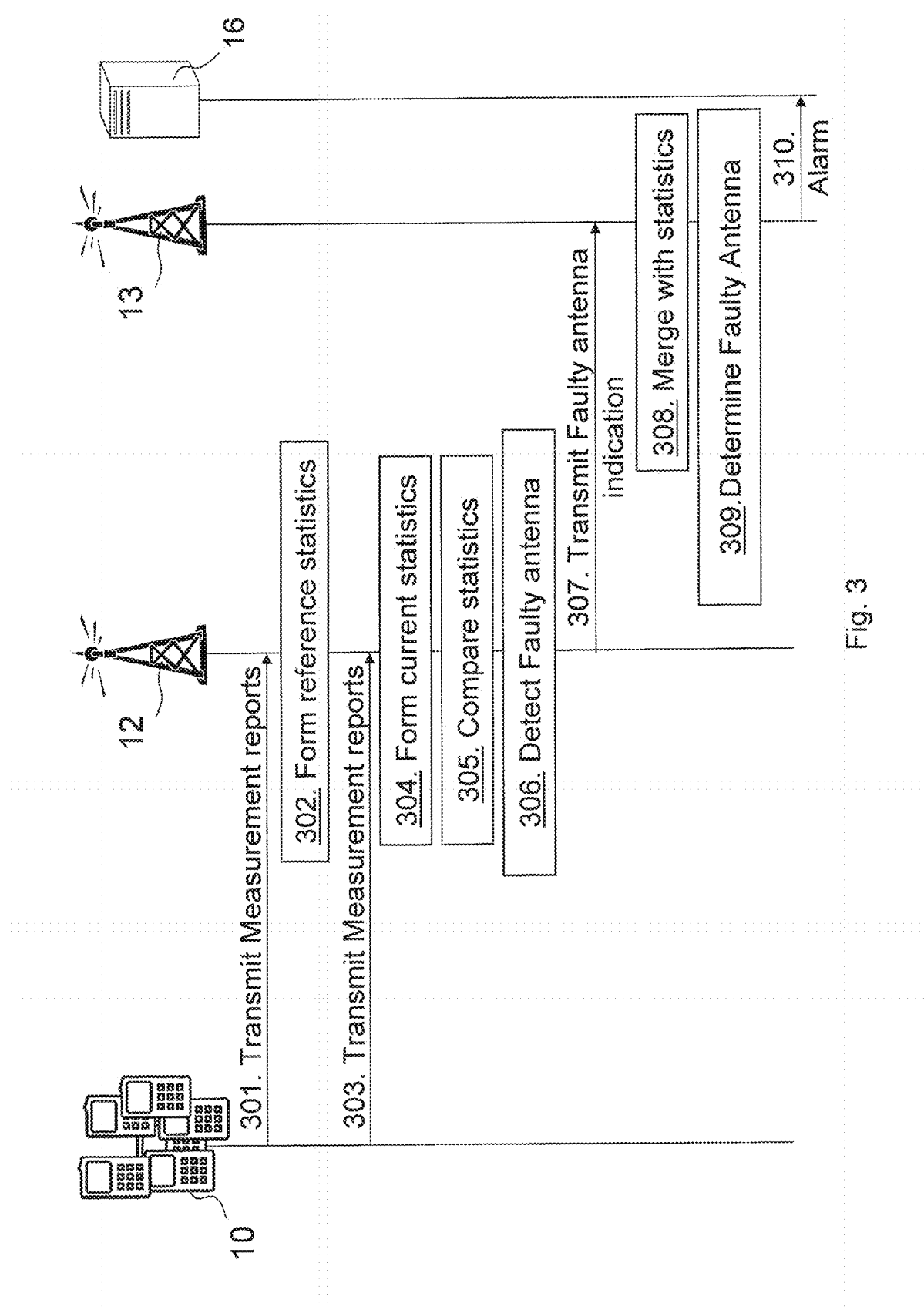
FIG. 3 is a combined flowchart and signaling scheme in a radio communications network.

FIG. 3 is a combined flowchart and signaling scheme in a radio communications network. As stated above the first radio base station 12 controls the first cell 14 and the second radio base station 13 controls the second cell 15.

Step 301. A first number of user equipments or at least one first user equipment transmits measurements reports over a first period of time to the first radio base station 12.

Step 302. The first radio base station 12 then forms reference statistics based on the received measurement reports. The measurement reports may be used to determine reference statistics on common cell border size or similar.

Step 303. A second number of user equipments or at least one second user equipment 10 then transmits measurement reports over a second period of time to the first radio base station 12. The second number of user equipments or at least one second user equipment may be different or the same as the first number of user equipments or the at least one first user equipment. The second period of time may be the same, longer or shorter than the first period of time. If the second period of time is of a same length as the first period of time a change in a cell relation may be e.g. more efficiently detected. The first and second period of time may be e g of the same length, but they may also be same time of day, week etc, to enable efficient detection.

Step 304. The first radio base station 12 the forms current statistics based on the measurement reports received over the second period of time.

Step 305. The first radio base station 12 then compares the current statistics with the reference statistics.

Step 306. In the illustrated example, the first radio base station 12 detects based on the compared statistics that a faulty antenna exists either at the first radio base station 12 or at the second radio base station 13. For example, if the comparison indicates that a different COBS, is present between the first cell 14 and the second cell 15.

Step 307. The first radio base station 12 may then transmit a faulty antenna indication to the second radio base station 13. Thus, the first radio base station 12 may transmit the faulty antenna indication to radio base stations over the X2 interface, which radio base stations manage or control the cells indicated in the reference or current statistics.

Step 308. The second radio base station 13 may then merge, or combine or correlate into merged statistics, the received faulty antenna indication with local statistics, i.e. current statistics and reference statistics collected locally at the second radio base station 13 as well as received faulty antenna indications from other radio base stations.

Step 309. The second radio base station 13 may then detect that the faulty antenna is comprised in the second radio base station 13 based on the merged statistics. For example, the second radio base station 13 may detect a faulty antenna with an algorithm using the locally collected statistics as well as received faulty antenna indications as input.

Step 310. The second radio base station 13 may then transmit an alarm message indicating a faulty antenna at the second radio base station 13 to the OAM node 16.

Thus, the operator will be informed, via the OAM node 16, of the faulty antenna and can take action to overcome a reduced performance of the second radio base station 13 and hence in the radio communications network.

Figure 4:
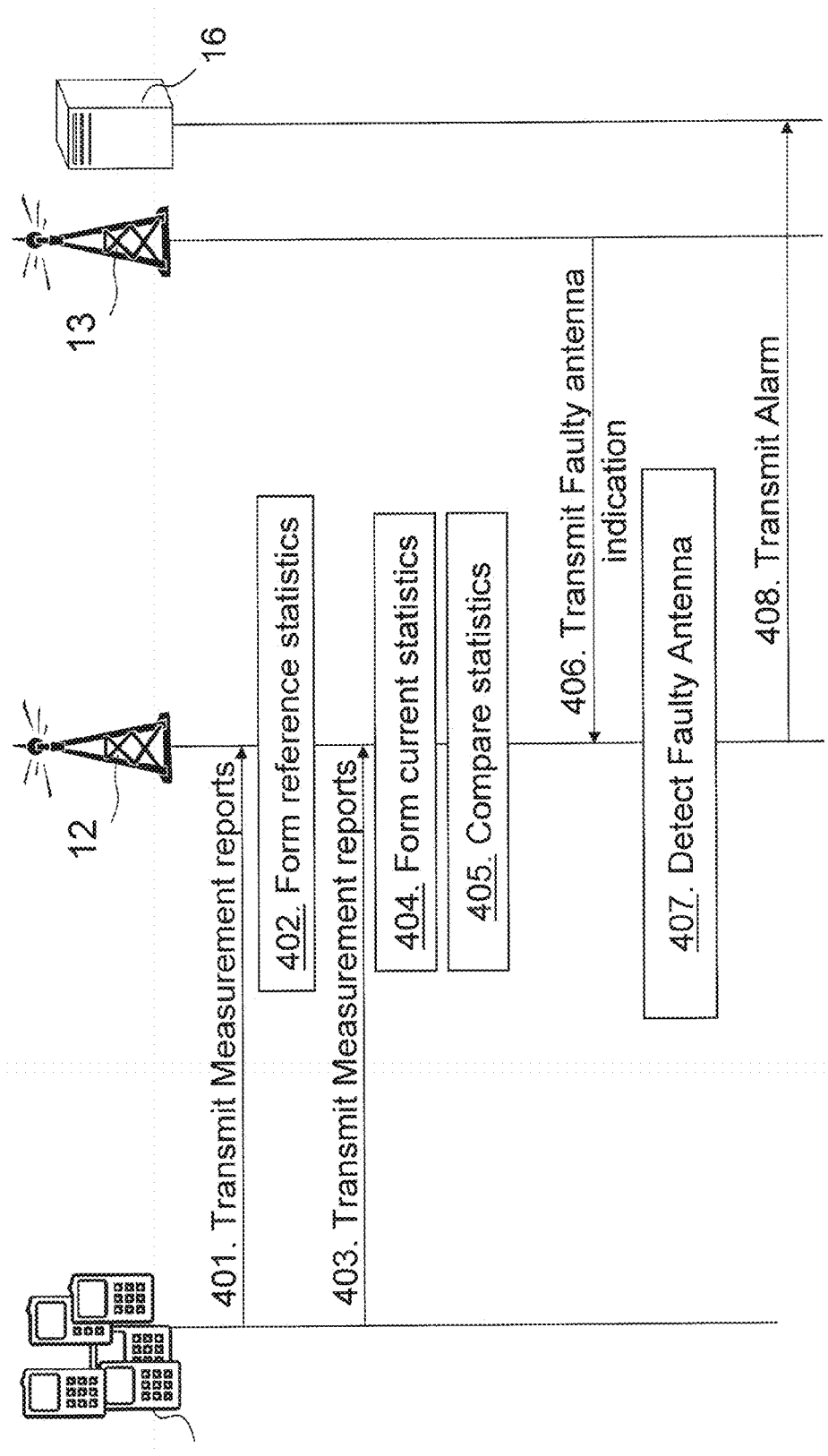
FIG. 4 is a combined flowchart and signaling scheme in a radio communications network.

FIG. 4 is a combined schematic flowchart and signaling scheme in a radio communications network.

Step 401. A first number of user equipments or at least one first user equipment transmits measurement reports over a first period of time to the first radio base station 12. A measurement report may indicate cell relations towards the first cell 14, e.g. a relation between the first cell 14 and the second cell 15. Step 401 corresponds to the step 301 in FIG. 3.

Step 402. The first radio base station 12 then forms reference statistics based on the received measurement reports. The measurement reports may be used to determine reference statistics on common cell border size or similar. Step 402 corresponds to the step 302 in FIG. 3.

Step 403. A second number of user equipments or at least one second user equipment 10 then transmits measurement reports over a second period of time to the first radio base station 12. The second number of user equipments or at least one second user equipment may be a different or the same as the first number of user equipment or at least one first user equipment. The second period of time may be the same or different than the first period of time as stated above. Step 403 corresponds to the step 303 in FIG. 3.

Step 404. The first radio base station 12 the forms current statistics based on the measurement reports received over the second period of time. Step 404 corresponds to the step 304 in FIG. 3.

Step 405. The first radio base station 12 then compares the current statistics with the reference statistics. Step 405 corresponds to the step 305 in FIG. 3.

Step 406. According to the illustrated example, one or more neighboring radio base stations such as the second radio base station 13 may transmit a faulty antenna indication, also referred to as an external faulty antenna indication, to the first radio base station 12. Thus, the first radio base station 12 receives faulty antenna indications from other radio base stations managing neighbor cells over the X2 interface. In the case where a neighboring cell is managed by the same first radio base station 12 the local faulty antenna indication is stored locally but used as input for a cell level heuristic algorithm.

Step 407. The first radio base station 12 may then, based on the received one or more external faulty antenna indications and the compared local statistics, detect that the faulty antenna is comprised in the first radio base station 12. For example, the first radio base station 12 may comprise criteria to detect if a local antenna is faulty, e.g. if more than two faulty antenna indications are received within a certain period of time, or if the compared statistics indicate a faulty antenna and at least two external faulty antenna indications are received. Thus, the first radio base station 12 may use a local faulty antenna indication, i.e. a faulty antenna indication at the first radio base station 12, and at least one received external faulty antenna indication as input for a network level heuristic algorithm that produces an alarm of a faulty antenna. Cell level means local here and network level means other cells in the network.

Step 408. The first radio base station 12 then, when having detected that the faulty antenna is comprised in the first audio base station 12, transmits an alarm message to the OAM node 16 for the operator to take measures to repair the antenna. The alarm message may be transmitted over a Mul interface to a managing node, such as the OAM node 16.

Figure 5:
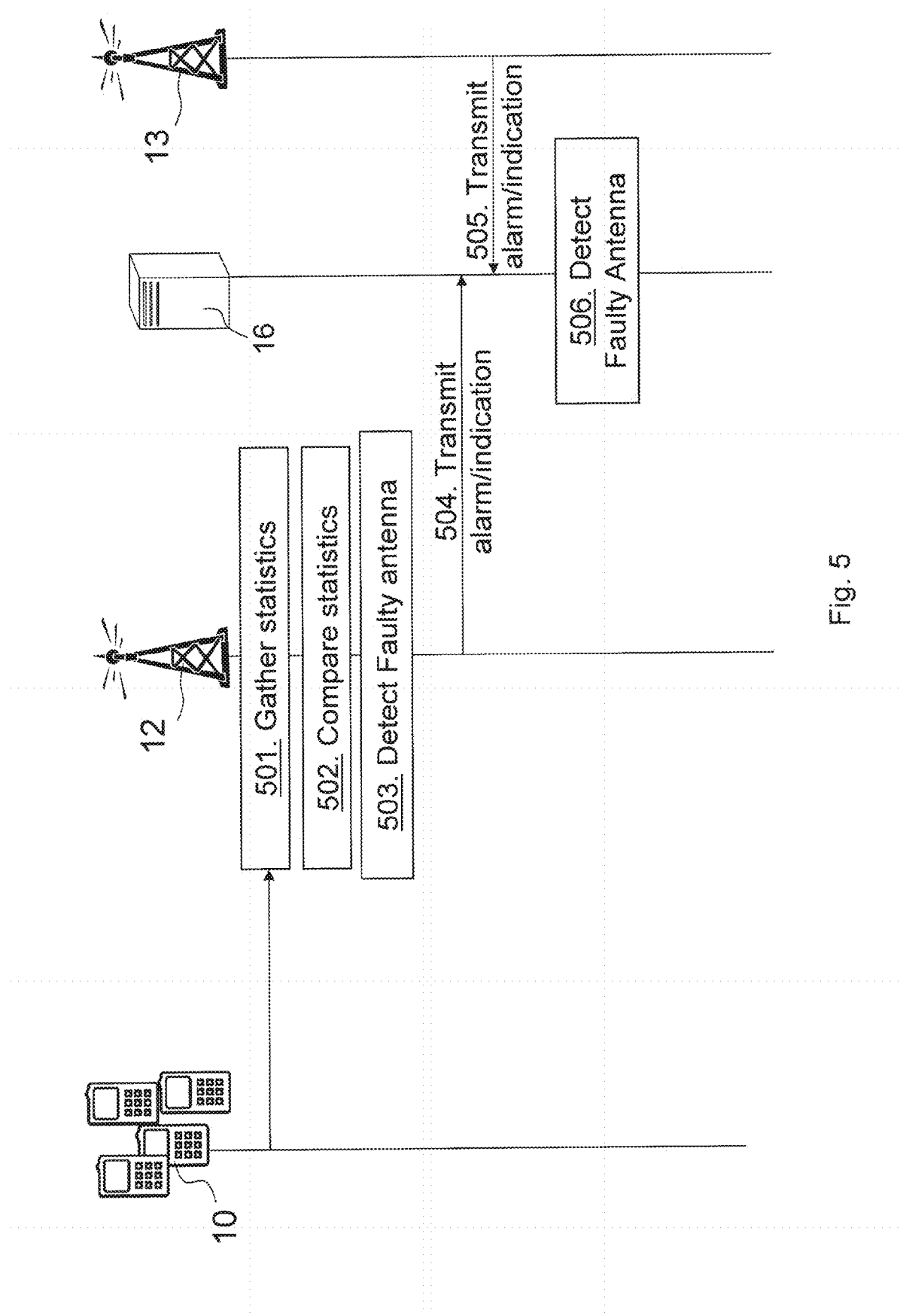
FIG. 5 is a combined flowchart and signaling scheme in a radio communications network.

FIG. 5 is a combined schematic flowchart and signaling scheme in a radio communications network.

Step 501. The first radio base station 12 gathers statistics. This step comprises the steps described in steps 301-304 in FIG. 3 or steps 401-404 in FIG. 4.

Step 502. The first radio base station 12 compares the reference statistics and the current statistics for detecting a change in the current statistics compared to the reference statistics. This step corresponds to the step 305 in FIG. 3 or step 405 in FIG. 405.

Step 503. The first radio base station 12 detects whether a faulty antenna is detected by analyzing the compared statistics. The change may be used as input for a cell level heuristic algorithm that produces a faulty antenna indication indicating a failure of a local antenna and/or an external faulty antenna indication of an antenna in a neighbor cell. This step corresponds to step 306 in FIG. 3.

Step 504. The first radio base station 12 may transmit a faulty antenna indication when a faulty antenna has been detected. This indication may be transmitted to the OAM node 16. If the first radio base station 12 has detected that the faulty antenna is local at the first radio base station 12, the first radio base station 12 may transmit an alarm message to the OAM node 16.

Step 505. The second radio base station 13 may transmit a faulty antenna indication or an alarm message of a faulty antenna to the OAM node 16 when a faulty antenna in the first radio base station 12 or second radio base station 13 has been detected.

Step 506. The OAM node 16 may then, based on the received faulty antenna indications or alarm messages, detect that a faulty antenna exists at the first radio base station 12 and/or at the second radio base station 13. E.g. if the OAM node 16 receives an indication from the first radio base station 12 and an alarm message from the second radio base station 13, the OAM node 16 detects that the second radio base station 13 has a faulty antenna.

Figure 6:
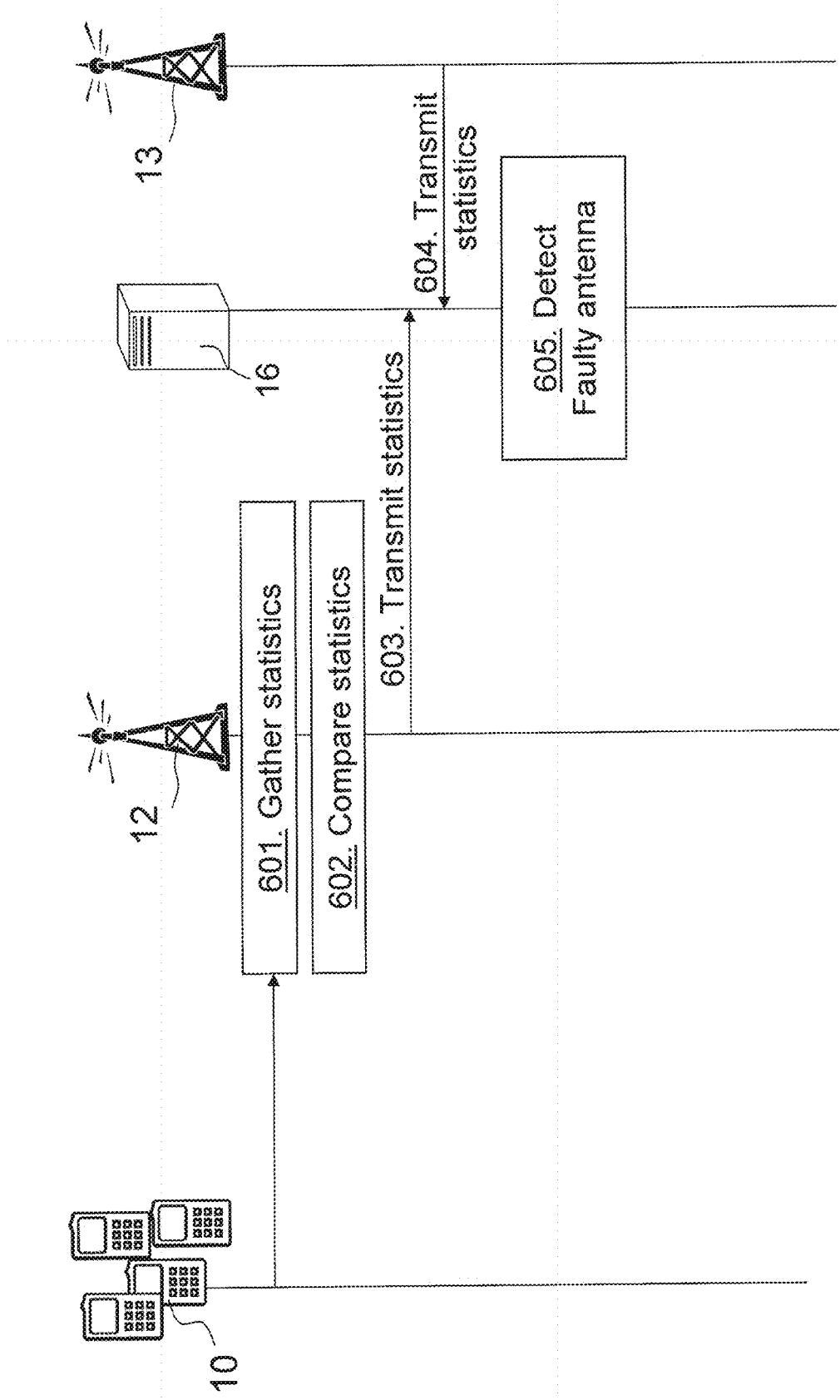
FIG. 6 is a combined flowchart and signaling scheme in a radio communications network.

FIG. 6 is a combined schematic flowchart and signaling scheme in a radio communications network.

Step 601. The first radio base station 12 gathers statistics. This step comprises the steps described in steps 301-304 in FIG. 3 or steps 401-404 in FIG. 4, and corresponds to the step 501 in FIG. 5.

Step 602. The first radio base station 12 compares the reference statistics and the current statistics for detecting a change in the statistics gathered. This step corresponds to the step 305 in FIG. 3, step 405 in FIG. 4 or step 502 in FIG. 5.

Step 603. The first radio base station 12 may transmit the statistics gathered to the OAM node 16 e.g. when the current statistics differ from reference statistics by more than a preset value. For example, if reference CCBS differs from current CCBS more than a threshold value.

Step 604. Correspondingly, the second radio base station 13 may transmit statistics formed or gathered at the second radio base station 13 to the OAM node 16.

Step 605. The OAM node 16 may then, based on the received statistics from the first radio base station 12 and the second radio base station 13, detect whether a faulty antenna exists at the first radio base station 12 and/or the second radio base station 13. This may be performed in a manner corresponding to that in the first radio base station 12 in step 306 in FIG. 3.

Figure 7:
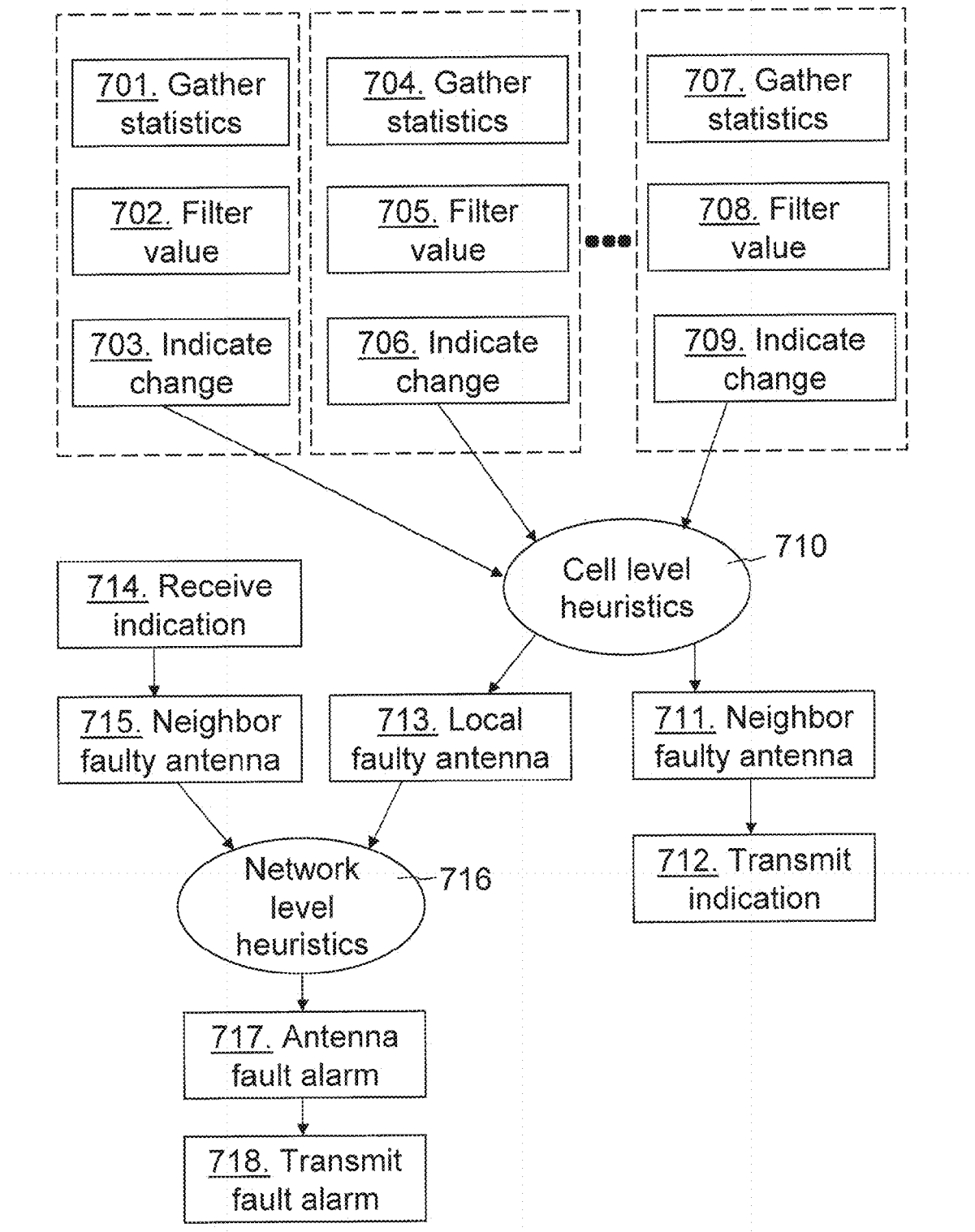
FIG. 7 is a flowchart of a process in a radio base station.

FIG. 7 is a schematic overview of a function to find a faulty antenna in a radio communications network.

Step 701. The first radio base station 12 gathers current statistics of received measurement reports.

Step 702. The first radio base station 12 filters the gathered current statistics. A filtered value may be based on gathered reference statistics to detect if the reference statistics deviate from the current statistics. E.g. changes in received measurement reports are detected by doing pass-band filtering of the current statistics, comparing the output of the filter with two configured thresholds indicating a negative and a positive change respectively.

Step 703. The first radio base station 12 may from the filtered gathered statistics detect indications of a change in the statistics, i.e. if the current statistics deviate from the reference statistics.

Step 704. The second radio base station 13 gathers current statistics of received measurement reports.

Step 705. The second radio base station 13 filters the gathered current statistics. A filtered value may be based on gathered reference statistics.

Step 706. The second radio base station 13 may from the filtered the gathered current statistics detect indications of a change in the statistics.

Step 707. The nth radio base station gathers current statistics of received measurement reports.

Step 708. The nth radio base station filters the gathered current statistics. A filtered value may be based on gathered reference statistics.

Step 709. The nth radio base station may from the filtered the gathered current statistics detect indications of a change in the statistics.

Step 710. The indicated changes are gathered at a cell level heuristic algorithm running on a radio base station or an OAM node.

Step 711. The cell level heuristic algorithm at e.g. the first radio base station 12 may detect that a faulty antenna is comprised in one of the neighbor radio base station e.g. the second radio base station 13, based on the gathered indicated changes from the nth radio base stations.

Step 712. The faulty antenna indication is then transmitted to the concerned radio base station with the detected faulty antenna.

Step 713. The cell level heuristic algorithm at the first radio base station 12 may detect that a faulty antenna is comprised in the first radio base station, a so called local faulty antenna.

Step 714. A neighboring radio base station such as the second radio base station 13 controlling a neighbor cell to the cell of the first radio base station 12 receives at least one faulty antenna indication.

Step 715. The neighboring radio base station detects from the received faulty antenna indication or indications that a faulty antenna is comprised in a neighboring radio base station, e.g. the first radio base station 12. The neighboring radio base station may then transmit an indication to the first radio base station 12.

Step 716. A network level heuristic algorithm running on e.g. the first radio base station 12 receives the different faulty antenna indications, and detects where a faulty antenna is comprised.

Step 717. The network level heuristic algorithm may then generate an alarm message.

Step 718. The first radio base station 12 may then transmit the alarm message to the OAM node 16.

Figure 8:
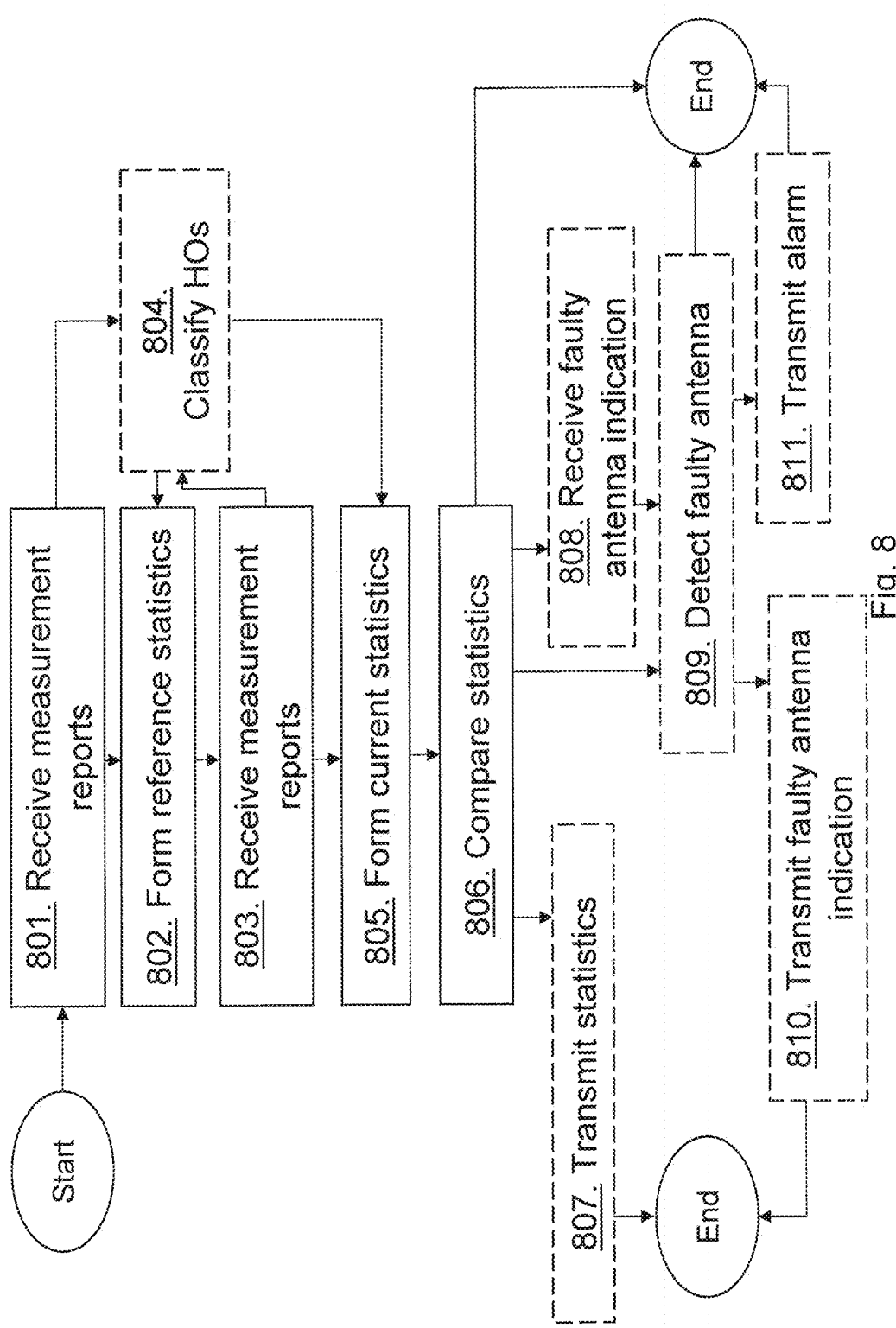
FIG. 8 is a schematic flowchart of a method in the radio base station.

FIG. 8 is a schematic flow chart depicting embodiments of a method in a first radio base station 12 for enabling detection of a faulty antenna in a radio communications network. The radio communication network comprises the first radio base station 12 providing radio coverage in a first cell 14, and a second radio base station 13 providing radio coverage in a second cell 15.

Step 801. The first radio base station 12 receives, from at least one user equipment in the first cell 14, a first set of measurement reports over a first period of time. At least some measurement reports indicate a cell relation between the first cell 14 and the second cell 15. The indicated cell relation may e.g. be based on signal strengths measured at the at least one user equipment. The first period or a number of measurement reports forming the first set of measurement reports may be pre-set or dynamically set, e.g. manually by the operator or according to a rule. In some embodiments the measurement reports may comprise Reference Signal Received Power, Reference Signal Received Quality, Radio Link Failure, or indication of handover.

Step 802. The first radio base station 12 forms reference statistics of the cell relation between the first cell 14 and the second cell 15 based on the received first set of measurement reports. The first radio base station 12 may in some embodiments form reference statistics wherein these reference statistics may indicate variables of different parameters, for example, a common cell border, a common cell border size or extended common cell border size.

The common cell border is a cell border that a cell shares with its neighbor cell, e.g. that the first cell 14 shares with the second cell 15. The cell border is the geographical area where these two cells are the best cells, e.g. where the cells have strongest radio signal, or best SINR for a user equipment.

The first radio base station 12 may form and store a neighbor cell relation between the first cell 14 and the second cell 15. As a part of the ANR and HO functions the user equipments continuously measure signal strength and quality of the serving cell, the first cell 14, as well as neighbor cells, e.g. the second cell 15. When the second cell 15 becomes an offset better in terms of e.g. signal strength, than the first cell 14, this is reported to the first radio base station 12 utilizing measurement reports as standardized. By counting the measurement reports where the second cell 15 is the best cell, and comparing with the total number of measurement reports, see formula below, a relative cell border size can be estimated. This measure does not directly correspond to the geographical size of the cell border, but rather to the visibility of the second cell 15 from a user equipment's perspective. This measure is referred to as Common Cell Border Size (CCBS).

The Extended Common Cell Border Size (ECCBS) is defined as a parameterized measure, where for example ECCBS(2) is defined as CCBS but instead of counting measurement reports where the second cell 15 is the best cell, we count measurement reports where the second cell 15 is the second best cell.

The CCBS for each neighboring cell, may be continuously calculated for each measurement report, using the formula below.

$$Y_k = (1-\alpha)Y_{k-1} + \alpha X_k$$

where:

$Y_k$ is the CCBS for a specific neighboring cell after the measurement report k;

$X_k$ is 1 if the specific neighboring cell is the best cell in measurement report k, and 0 otherwise; and $\alpha$ is a filter coefficient, e.g. in a value range of 0-1.

The ECCBS of any rank x for each neighboring cell, may be continuously calculated for each measurement report, using the formula below.

$$Z_{x,k}=(1-\alpha)Z_{x,k-1}+\alpha P_{x,k}$$

where:
$Z_{x,k}$ is the ECCBS for the specific neighboring cell after the measurement report k;
$P_{x,k}$ is 1 if the specific neighboring cell is the number x cell, e.g. second rank ordered from the best cell, in measurement report k, and 0 otherwise; and
α is the filter coefficient In some embodiments the formed reference statistics and the current statistics, see step 805, is an average reported Reference Signal Received Power (RSRP) for each neighbor cell, continuously calculated from the RSRP values in the received measurement reports where the neighbor cell, e g the second cell 15, is the best cell, using the formula below:

$$R_k=(1-\alpha)R_{k-1}+\alpha RSRP_k$$

where:
$R_k$ is the average RSRP for the specific neighboring cell e.g. the second cell 15, after measurement report number k;
$RSRP_k$ is the RSRP reported in measurement report number k; and
α is the filter coefficient.

It should be noted that the Reference Signal Received Quality (RSRQ) may be the measured parameter or variable for which reference statistics as well as current statistics are formed.

In some embodiments the radio link failure rate of the second cell 15 or number of indications of Handover between the first cell 14 and the second cell 15 may be the measured parameter or variable for which reference statistics as well as current statistics are formed.

Step 803. The first radio base station 12 receives, from at least one user equipment in the first cell 14, a second set of measurement reports over a second period of time. The user equipment or user equipments in step 801 and 803 may be the same or different user equipment or user equipments. The second period or the second set of measurement reports may be pre-set or dynamically set, e.g. manually set or set according to a rule. In some embodiments, the first radio base station 12 may collect statistics indicating cell relations, and analyse the trend of the cell relations. A cell relation may indicate a neighbor relation that is the connection between two cells that may perform handover of user equipments between each other. A cell relation may be configured or may be detected by an ANR function.

Step 804. In some embodiments the received measurement reports indicate handover of the at least one user equipment to the second cell 15. Then the first radio base station 12 may classify the handovers as non-oscillating Handover (HO) attempts and only then perform the forming of statistics in step 805, i.e. only if the handovers are classified as non-oscillating HO attempts so that only non-oscillating HO impact the statistics. A function for classifying handovers as an oscillating handover or a non-oscillating handover is used in embodiments herein to improve the input measurements for antenna fault detection. For example, the first radio base station 12 or a centralized node may determine that a number of HOs back and forth within a set time period is an oscillating handover. Embodiments herein use oscillation detection to clean out oscillating HOs from the CCBS, ECCBS or from HO rate.

This may also be performed before forming the reference statistics in step 802.

Step 805. The first radio base station 12 forms current statistics of the cell relation between the first cell 14 and the second cell 15 based on the second set of measurement reports. Examples of statistics are described in step 802. Forming the current statistics and reference statistics may comprise computing mean values and standard deviation of the first set of measurement reports and/or the second set of measurement reports.

Step 806. The first radio base station 12 compares the current statistics with the reference statistics to enable the detection of a faulty antenna. That is, the comparison of the previous indication of a cell relation with the current indication of the cell relation is used as an indication that a faulty antenna is detected. The first radio base station 12 may in some embodiments compare the current statistics with the reference statistics by pass-band filtering the received measurement reports. Thus, the changed statistics are detected by doing pass-band filtering of the current statistics, comparing the output of the filter with two configured thresholds indicating a negative and a positive change respectively. The two configured thresholds may be based from the reference statistics.

In some embodiments, changes in measurement reports, or cell relations, are detected by continuously or intermittently using historic data, such as the reference statistics, to compute mean value and standard deviation of the measured parameter or variable reported in the measurement reports. The first radio base station 12 may then compare the input data, e.g. the current statistics, with the mean value plus or minus a configured factor times the standard deviation as a threshold, and indicate a positive or negative change when the low pass filtered measurement deviate from this threshold. I.e. the current statistics deviate from the reference statistics by a value below the lower threshold or above the upper threshold.

It should here be understood that in some embodiments, the first set of measurement reports may indicate a non-cell relation between the first cell 14 and the second cell 15. That is, user equipments within the first cell 14 do not receive any signals from the second cell 15 indicating that the first cell 14 and the second cell 15 are not neighboring cells and no neighbor cell relations are established. However, the antenna of e.g. the second radio base station 13 may be so misaligned that suddenly user equipments in the first cell 14 detect the second cell 15 and the second set of measurements reports reported to the first radio base station 12 forms a cell relation between the first cell 14 and the second cell 15, e.g. where a CCBS is wider than previously. The first radio base station 12 may then compare and detect a major change in the indicated cell relation and therefore may report a faulty antenna to the second radio base station 13 or OAM node 16. The same goes in the other direction, i.e. the first radio base station 12 comprises a cell relation between the first cell 14 and the second cell 15 by receiving a first set of measurement reports indicating a cell relation between the first cell 14 and the second cell 15. Then, over a second period of time the first radio base station 12 may not receive any measurement reports indicating a cell relation between the first cell 14 and the second cell 15, for example because user equipments within the first cell 14 do not receive any signal from the second cell 15 anymore. This may e.g. happen if the antenna gets greatly misaligned and/or gets tilted or similar.

Step 807. The first radio base station 12 may transmit a statistics message to the Operation and Maintenance node 16, which statistics message comprises the current statistics and/or the reference statistics. This step may be performed in some embodiments as indicated by the dashed line. Thus, the determination whether a faulty antenna exists may be performed e.g. at the OAM node 16.

Step 808. The first radio base station 12 may receive an external faulty antenna indication from the second radio base station 13 indicating a faulty antenna at the first radio base station 12, and taking the received external faulty antenna indication into account when detecting that the antenna is a faulty antenna.

Step 809. The first radio base station 12 may in some embodiments detect that an antenna is a faulty antenna when the current statistics deviate from the reference statistics. For example, current CCBS gets wider or smaller than the CCBS of reference measurement reports.

The first radio base station 12 may detect that the antenna, being the faulty antenna, is comprised at the second radio base station 13 when the current statistics indicate a radio coverage of the second cell 15 that is different than a radio coverage of the second cell 15 indicated by the reference statistics. Furthermore, as stated in step 808 the external faulty antenna indication may be taken into account when detecting that the antenna is faulty.

Step 810. The first radio base station 12 may transmit, when detected that a faulty antenna exist, a faulty antenna indication to the second radio base station 13 or the Operation and Maintenance node 16. The faulty antenna indication comprises information indicating a faulty antenna and information associated with the current statistics. The faulty antenna indication may thus be sent if the detection concerns an antenna in another cell, or in own cell. The faulty antenna indication may or may not indicate in which one of the cells the antenna is faulty.

In some embodiments, the steps of receiving, forming and comparing statistics are performed for cell relations between the first cell and a number of second cells. Then the faulty antenna indication is triggered to be transmitted when a faulty antenna is detected for only one cell relation between the first cell and one of the second cells out of the number of second cells. Thus, the method is performed for each of a set of neighbor cells, i.e. current statistics are compared to reference statistics for cell relations between the first cell and each neighbor cell in the set of neighbor cells. In other words, the method is applied to the cell relation between the first cell and the second cell, where the second cell is in turn each one of the neighbor cells in the set of neighbor cells.

In some embodiments, the receiving, forming and comparing are performed for cell relations between the first cell and a number of second cells. The faulty antenna is detected as comprised at the first radio base station 12 when a faulty antenna is detected for cell relations between the first cell and a plurality of the second cells out of the number of second cells Step 811. The first radio base station 12 may transmit an alarm message to the Operation and Maintenance node 16, which alarm message indicates that the antenna in the first radio base station 12 is a faulty antenna. That is, when the first radio base station 12 has detected that the faulty antenna is one of its own antennas.

Figure 9:
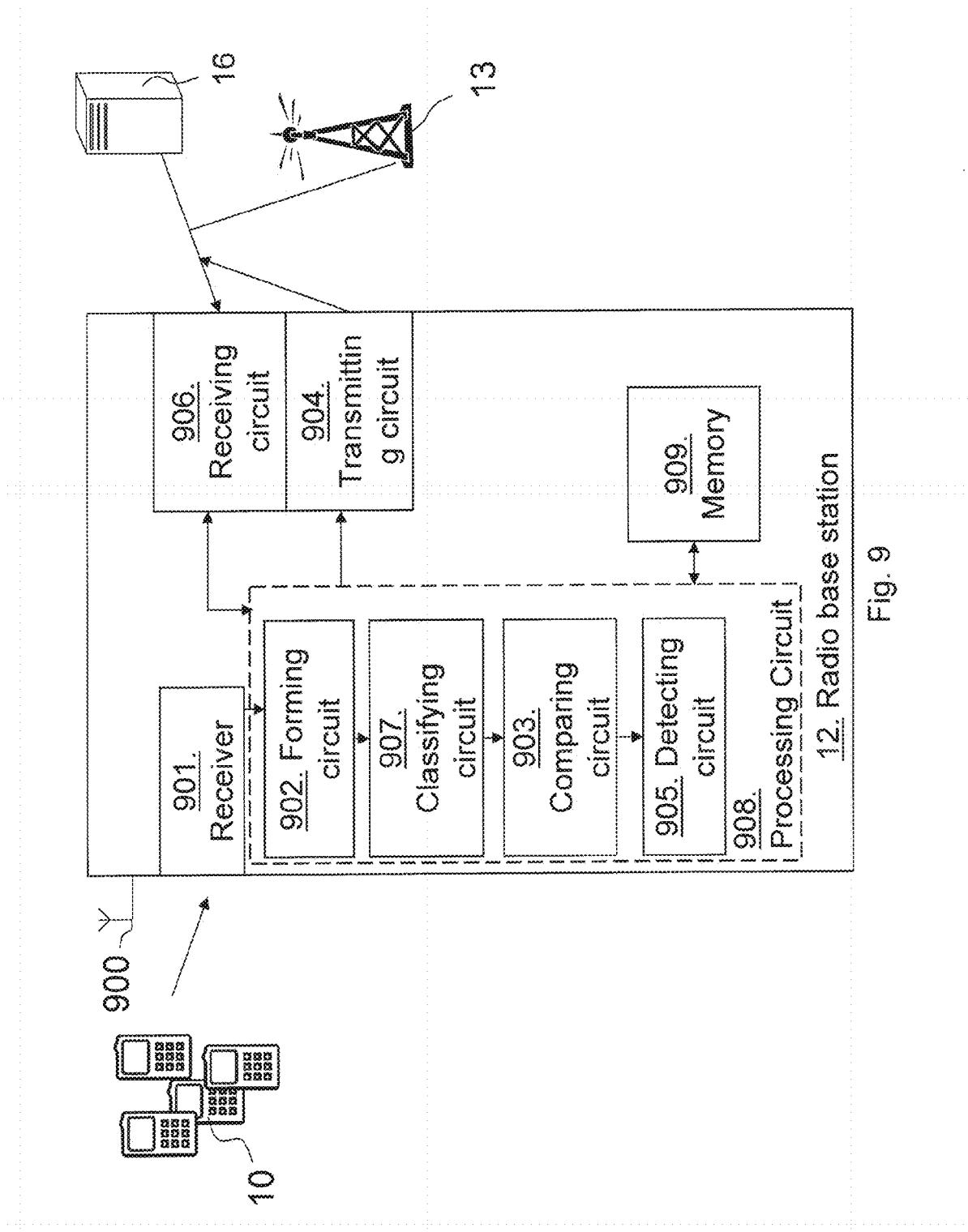
FIG. 9 is a block diagram depicting a radio base station.

FIG. 9 is a block diagram depicting the first radio base station 12 for enabling detection of a faulty antenna in a radio communications network. The first radio base station 12 is arranged to provide radio coverage in a first cell 14 via at least one antenna 900. A second radio base station 13 in the radio communications network is arranged to provide radio coverage in a second cell 15. The first radio base station 12 comprises a receiver 901 configured to receive, from at least one user equipment in the first cell 14, a first set of measurement reports over a first period of time and to receive, from at least one user equipment in the first cell 14, and a second set of measurement reports over a second period of time. At least some of the measurement reports indicate a cell relation between the first cell 14 and the second cell 15. The indicated cell relation may be based on signal strengths measured at the at least one user equipment. The first radio base station 12 further comprises a forming circuit 902 configured to form reference statistics of the cell relation between the first cell 14 and the second cell 15 based on the first set of measurement reports and to form current statistics of the cell relation between the first cell 14 and the second cell 15 based on the second set of measurement reports. The first radio base station 12 further comprises a comparing circuit 903 configured to compare the current statistics with the reference statistics to enable the detection of a faulty antenna in the first radio base station 12 or the second radio base station 13. This may for example be done by detecting a change between the reference statistics and the current statistics.

In some embodiments the first radio base station 12 further comprises a transmitting circuit 904 configured to transmit a statistics message to an Operation and Maintenance node 16. The statistics message comprises the current statistics and/or the reference statistics.

In some embodiments the first radio base station 12 further comprises a detecting circuit 905 configured to detect an antenna as a faulty antenna when the current statistics deviate from, e g by being above or below with a pre-set offset, the reference statistics. In some embodiments the transmitting circuit 904 may further be configured to transmit a faulty antenna indication to the second radio base station 13 or the Operation and Maintenance node 16. The faulty antenna indication comprises information indicating a faulty antenna and information associated with the current statistics. E.g. the faulty antenna indication may comprise ECCB or CCB data as well as a flag, one bit, indicating the detection of a faulty antenna.

In some embodiments the first radio base station 12 is arranged to receive, form and compare statistics for cell relations between the first cell and a number of second cells. The transmitting circuit 904 may then be configured to get triggered to transmit the faulty antenna indication when a faulty antenna is detected for only one cell relation between the first cell and one of the second cells out of the number of second cells. In some embodiments, the detecting circuit 905 may then be further configured to detect that the faulty antenna is comprised at the first radio base station 12, being the at least one antenna 900, when a faulty antenna is detected for cell relations between the first cell and a plurality of the second cells out of the number of second cells. The transmitting circuit 904 may additionally or alternatively be configured to transmit an alarm message to an Operation and Maintenance node 16. The alarm message indicates that the antenna in the first radio base station is a faulty antenna. In some embodiments the detecting circuit 905 is further configured to detect that the antenna, being the faulty antenna, is comprised at the second radio base station 13 when the current statistics indicate a radio coverage of the second cell 15 that is different than a radio coverage of the second cell 15 indicated by the reference statistics.

In some embodiments the first radio base station 12 further comprises a receiving circuit 906 configured to receive an external faulty antenna indication from the second radio base station 13 indicating a faulty antenna. Then, the detecting circuit 905 may be configured to take the received external faulty antenna indication into account when detecting that the antenna is a faulty antenna.

In some embodiments the forming circuit 902 may be configured to form reference statistics and/or current statistics by computing mean values and standard deviation of the first set of measurement reports and/or the second set of measurement reports. In some embodiments the reference statistics and/or current statistics indicates a common cell border size or an extended common cell border size, indicating a radio coverage area covered by both the first cell 14 and the second cell 15 as stated above. In some embodiments the measurement reports may comprise Reference Signal Received Power, Reference Signal Received Quality, Radio Link Failure, or indication of handover. In some embodiments the comparing circuit 903 may be configured to passband filter the received measurement reports.

In some embodiments the received measurement reports indicate handover of the at least one user equipment to the second cell 15. Then, the first radio base station 12 may further comprise a classifying circuit 907 configured to classify the handovers as non-oscillating handover attempts and so that only non-oscillating HO impacts the reference and current statistics.

The embodiments herein for enabling detection of a faulty antenna may be implemented through one or more processors, such as a processing circuit 908 in the first radio base station 12 depicted in FIG. 9, together with computer program code for performing the functions and/or method steps of the embodiments herein. The program code mentioned above may also be provided as a computer program product, for instance in the form of a data carrier carrying computer program code for performing the functions and/or method steps of the embodiments herein when being loaded into the first radio base station 12. One such carrier may be in the form of a CD ROM disc. It is however feasible with other data carriers such as a memory stick. The computer program code may furthermore be provided as pure program code on a server and downloaded to the first radio base station 12.

In some embodiments the first radio base station 12 further comprises a memory 909 that may comprise one or more memory units and may be used to store for example data such as reference statistics and current statistics, measurement reports, CCBS, ECCBS, oscillating classifying data, external faulty antenna indications, application to perform the methods herein when being executed on the first radio base station 12 or similar.

Figure 10:
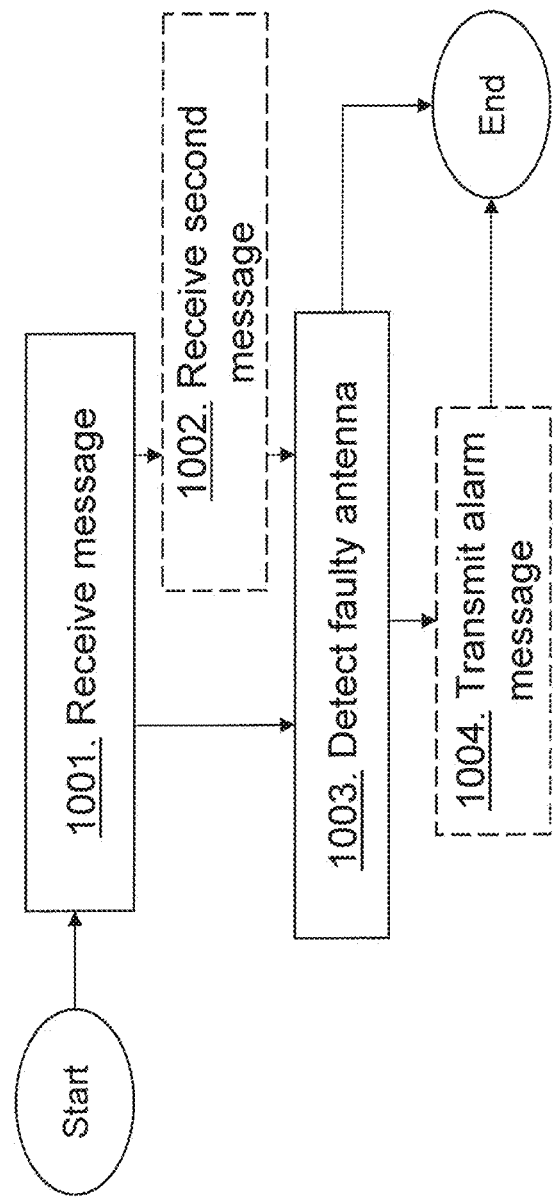
FIG. 10 is a schematic flowchart of a method in a radio network node.

FIG. 10 is a schematic flow chart depicting embodiments of a method in a radio network node 13,16 for enabling detection of a faulty antenna in a radio communications network. The radio communication network comprises the first radio base station 12 providing radio coverage in a first cell 14, and a second radio base station 13 providing radio coverage in a second cell 15. The radio network node 13,16 may comprise the second radio base station 13 or an Operation And Maintenance node 16.

Step 1001. The radio network node, e.g. the second radio base station 13 or the OAM node 16 receives, from the first radio base station 12, at least one message relating to a cell relation between the first cell 14 and the second cell 15. The received at least one message may comprise a faulty antenna indication. The faulty antenna indication may comprise information indicating a faulty antenna at the second radio base station 13 or at the first radio base station 12. The faulty antenna indication relates to the cell relation between the first cell 14 and the second cell 15 as the faulty antenna impacts the cell relation between these cells.

In some embodiments the radio network node 13,16 may be represented by a Operation and Maintenance node 16, and the received at least one message may then comprise an alarm message. The alarm message indicates that the antenna in the first radio base station 12 or the second radio base station 13 is a faulty antenna. The alarm message relates thereby to the cell relation between the first cell 14 and the second cell 15 as the faulty antenna impacts the cell relation between these cells. The received at least one message at the Operation and Maintenance node 16 may further comprise a statistics message. The statistics message may comprise current statistics of a cell relation between the first cell 14 and the second cell 15 and/or reference statistics of the cell relation between the first cell 14 and the second cell 15. The reference statistics is formed based on a first set of measurement reports received over a first period of time in the first cell 14. The current statistics is formed based on a second set of measurement reports received over a second period of time in the first cell 14. At least some measurement reports indicate a cell relation between the first cell 14 and the second cell 15. The indicated cell relation may be based on signal strengths measured by at least one user equipment in the first cell 14. The reference statistics and current statistics may indicate different parameters, for example, a common cell border size or extended common cell border size as stated above.

Step 1002. In some embodiments the radio network node 13,16 may be represented by a Operation and Maintenance node 16. The Operation and Maintenance node 16 may receive a second message from the second radio base station 13. The second message indicates a cell relation between the first cell 14 and the second cell 15. The indicated cell relation may be based on signal strengths measured by the at least one user equipment.

Step 1003. The radio network node 13,16 detects that the antenna comprised at the first radio base station 12 or at the second radio base station 13 is a faulty antenna by analysing the received at least one message. In some embodiments the radio network node 13,16 may be represented by a Operation and Maintenance node 16, and the Operation and Maintenance node 16 may detect based on the at least one message and the second message whether a faulty antenna is comprised in the second radio base station 13.

Step 1004. When the radio network node 13,16 detects that the second radio base station 13 comprises a faulty antenna, e.g. when the radio network node is represented by the second radio base station 13, the second radio base station 13 may transmit an alarm message to an Operation and Maintenance node 16, which alarm message indicates that the antenna in the second radio base station 13 is a faulty antenna.

Figure 11:
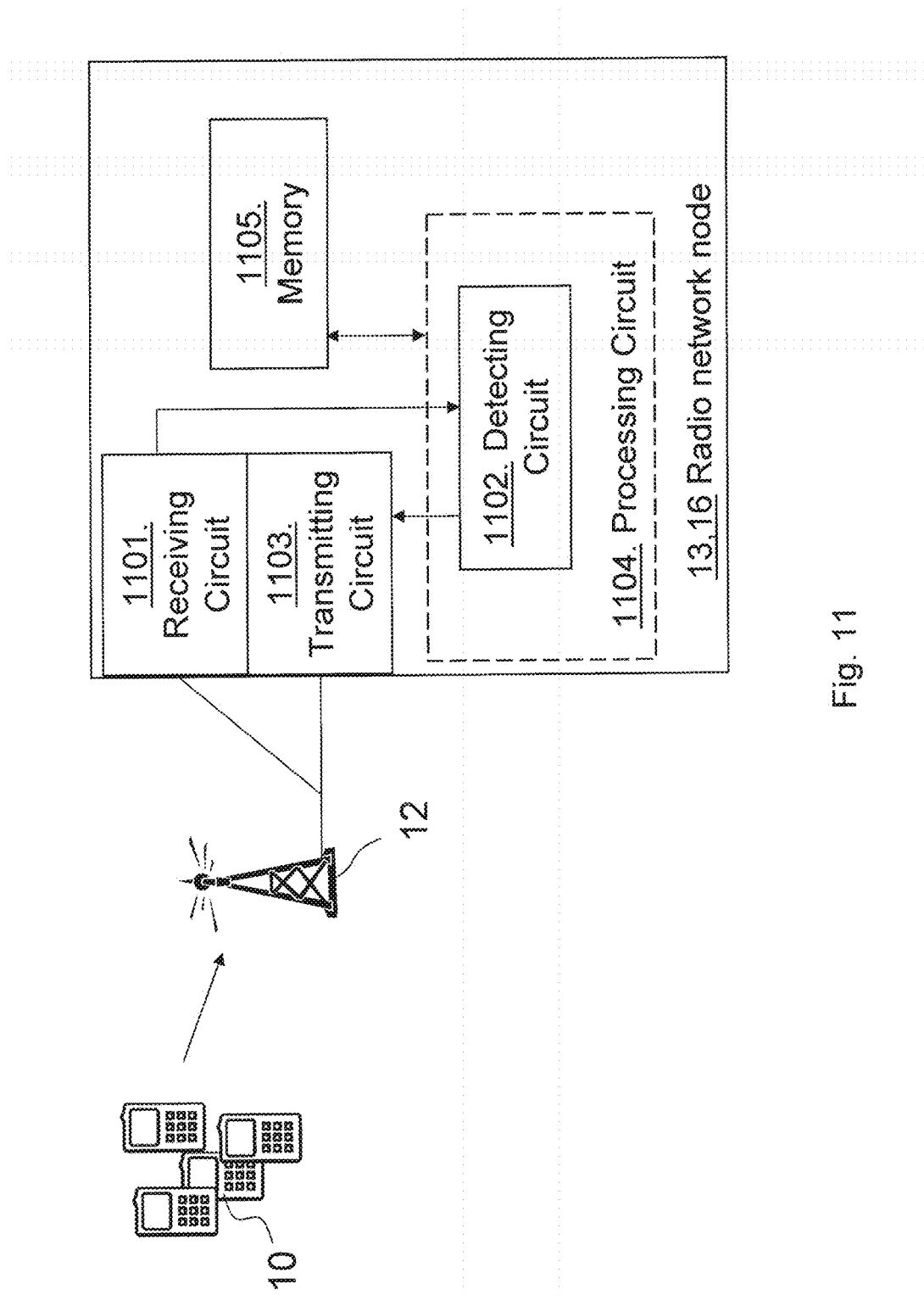
FIG. 11 is a block diagram depicting the radio network node.

FIG. 11 is a block diagram depicting a radio network node, such as the second radio base station 13 or the operation and maintenance node 16, for enabling detection of a faulty antenna in a radio communications network. A first radio base station 12 provides radio coverage in a first cell 14, and a second radio base station 13 provides radio coverage in a second cell 15. The radio network node 13,16 comprises a receiving circuit 1101 configured to receive at least one message relating to a cell relation between the first cell 14 and the second cell 15, from the first radio base station 12.

The radio network node 13,16 further comprises a detecting circuit 1102 configured to detect that an antenna comprised at the first radio base station 12 or at the second radio base station 13 is a faulty antenna by analysing the received at least one message. In some embodiments the received at least one message comprises a faulty antenna indication. The faulty antenna indication comprises information indicating a faulty antenna at the second radio base station 13 or at the first radio base station 12.

The radio network node being the second radio base station 13 may in some embodiments further comprise a transmitting circuit 1103 that is configured to, when the second radio base station 13 is detected to comprise a faulty antenna, transmit an alarm message to an Operation and Maintenance node 16. The alarm message indicates that the antenna in the second radio base station 13 is a faulty antenna.

In some embodiments when the radio network node is the OAM node 16 the received at least one message comprises an alarm message. The alarm message indicates that the antenna in the first radio base station 12 or the second radio base station 13 is a faulty antenna. In some embodiments the received at least one message comprises a statistics message. The statistics message comprises current statistics of a cell relation between the first cell 14 and the second cell 15 and/or reference statistics of the cell relation between the first cell 14 and the second cell 15. The reference statistics is formed based on a first set of measurement reports received over a first period of time in the first cell 14, and the current statistics is formed based on a second set of measurement reports received over a second period of time in the first cell 14. At least some measurement reports indicate a cell relation between the first cell 14 and the second cell 15. The indicated cell relation may be based on signal strengths measured at the at least one user equipment. In some embodiments the receiving circuit 1101 is further configured to receive a second message from the second radio base station 13. The second message indicates a cell relation between the first cell 14 and the second cell 15 based on measurement reports received from at least one user equipment in the second cell 15. The detecting circuit 1102 may in some embodiments further be configured to detect whether a faulty antenna is comprised in the second radio base station 13 or the first radio base station 12 based on the at least one message and the second message.

The embodiments herein for enabling detection of a faulty antenna may be implemented through one or more processors, such as a processing circuit 1104 in the radio network node 13,16 depicted in FIG. 11, together with computer program code for performing the functions and/or method steps of the embodiments herein. The program code mentioned above may also be provided as a computer program product, for instance in the form of a data carrier carrying computer program code for performing the functions and/or method steps of the embodiments herein when being loaded into the radio network node 13,16. One such carrier may be in the form of a CD ROM disc. It is however feasible with other data carriers such as a memory stick. The computer program code may furthermore be provided as pure program code on a server and downloaded to the radio network node 13,16.

In some embodiments the radio network node may comprise a memory 1105 that may comprise one or more memory units and may be used to store for example data such as current statistics, reference statistics, faulty antenna indication, alarm messages, CCBs, ECCBs, application to perform the methods herein when being executed on the radio network node 13,16 or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of embodiments herein is being defined by the following claims.

The invention claimed is:

1. A method in a first radio base station for enabling detection of a faulty antenna in a radio communications network, which radio communication network comprises the first radio base station, providing radio coverage in a first cell, and a second radio base station providing radio coverage in a second cell, the method comprising:
receiving, from at least one user equipment in the first cell, a first set of measurement reports over a first period of time, at least some of the measurement reports indicating a cell relation between the first cell and the second cell;
forming reference statistics of the cell relation between the first cell and the second cell, based on the first set of measurement reports;
receiving, from at least one user equipment in the first cell, a second set of measurement reports over a second period of time;
forming current statistics of the cell relation between the first cell and the second cell based on the second set of measurement reports; and
comparing the current statistics with the reference statistics to enable the detection of a faulty antenna in the first radio base station or the second radio base station.

2. The method of claim 1, further comprising transmitting a statistics message to an Operation and Maintenance node, the statistics message comprising the current statistics or the reference statistics or both.

3. The method of claim 1, further comprising detecting an antenna as a faulty antenna in the event that the current statistics deviate from the reference statistics.

4. The method of claim 3, further comprising transmitting a faulty antenna indication to the second radio base station or an Operation and Maintenance node, the faulty antenna indication comprising information indicating a faulty antenna and information associated with the current statistics.

5. The method of claim 4, wherein said receiving, forming and comparing statistics are performed for cell relations between the first cell and a number of second cells, and wherein the transmitting of the faulty antenna indication is triggered when a faulty antenna is detected for only one cell relation between the first cell and one of the second cells out of the number of second cells.

6. The method of claim 3, wherein said receiving, forming and comparing statistics are performed for cell relations between the first cell and a number of second cells, and wherein the detecting comprises detecting that the faulty antenna is in the first radio base station in the event that a faulty antenna is detected for cell relations between the first cell and a plurality of the second cells out of the number of second cells.

7. The method of claim 3, further comprising transmitting an alarm message to an Operation and Maintenance node, the alarm message indicating that the antenna in the first radio base station is a faulty antenna.

8. The method of claim 3, wherein said detecting that the antenna is a faulty antenna comprises detecting that the faulty antenna is in the second radio base station in the event that the current statistics indicate a radio coverage of the second cell that is different than a radio coverage of the second cell indicated by the reference statistics.

9. The method of claim 3, further comprising receiving an external faulty antenna indication from the second radio base station and taking the received external faulty antenna indication into account when detecting that the antenna is a faulty antenna.

10. The method of claim 1, wherein the forming of reference statistics comprises computing mean values and standard deviation of the first set of measurement reports or the forming of current statistics comprises computing mean values and standard deviation of the second set of measurement reports, or both.

11. The method of claim 1, wherein the reference statistics or current statistics or both indicate a common cell border size or an extended common cell border size, indicating a radio coverage area covered by both the first cell and the second cell.

12. The method of claim 1, wherein the measurement reports comprise Reference Signal Received Power, Reference Signal Received Quality, Radio Link Failure, or indication of handover.

13. The method of claim 1, wherein the comparing comprises pass-band filtering the received measurement reports.

14. The method of claim 1, wherein the received measurement reports indicate a handover of the at least one user equipment to the second cell, and wherein the method further comprises classifying the handover as a non-oscillating handover attempt so that only non-oscillating handover attempts impacts the reference and current statistics.

15. A method in a radio network node for enabling detection of a faulty antenna in a radio communications network, which radio communications network comprises a first radio base station providing radio coverage in a first cell and a second radio base station providing radio coverage in a second cell, the method comprising:
  receiving at least one message relating to a cell relation between the first cell and the second cell; and
  detecting that an antenna at the first radio base station or at the second radio base station is a faulty antenna by analyzing the received at least one message.

16. The method of claim 15, wherein the received at least one message comprises a faulty antenna indication, which faulty antenna indication comprises information indicating a faulty antenna at the second radio base station or at the first radio base station.

17. The method of claim 15, further comprising, when the second radio base station is detected to comprise a faulty antenna, transmitting an alarm message to an Operation and Maintenance node, which alarm message indicates that the antenna in the second radio base station is a faulty antenna.

18. The method of claim 15, wherein the radio network node is represented by the second radio base station.

19. The method of claim 15, wherein the radio network node is represented by an Operation and Maintenance node.

20. The method of claim 19, wherein the received at least one message comprises an alarm message, which alarm message indicates that the antenna in the first radio base station or the second radio base station is a faulty antenna.

21. The method of claim 19, wherein the received at least one message comprises a statistics message, which statistics message comprises current statistics of a cell relation between the first cell and the second cell or reference statistics of the cell relation between the first cell and the second cell, or both, and which reference statistics, if any, are formed based on a first set of measurement reports received over a first period of time in the first cell, and which current statistics, if any, are formed based on a second set of measurement reports received over a second period of time in the second cell, and wherein at least some measurement reports are indicating a cell relation between the first cell and the second cell.

22. The method of claim 19, further comprising receiving a second message from the second radio base station, which second message indicates a cell relation between the first cell and the second cell based on measurement reports received from at the at least one user equipment in the second cell, and wherein said detecting whether a faulty antenna is comprised in the second radio base station or the first radio base station is based on the at least one message and the second message.

23. A first radio base station for enabling detection of a faulty antenna in a radio communications network, which first radio base station is arranged to provide radio coverage in a first cell, the first radio base station comprising:
  at least one antenna providing the radio coverage in the first cell;
  a receiver configured to receive, from at least one user equipment in the first cell, a first set of measurement reports over a first period of time, at least some of the measurement reports indicating a cell relation between the first cell and a second cell having radio coverage provided by a second radio base station in the radio communications network, and to receive, from at least one user equipment in the first cell, a second set of measurement reports over a second period of time;
  a forming circuit configured to form reference statistics of the cell relation between the first cell and the second cell based on the first set of measurement reports, and to form current statistics of the cell relation between the first cell and the second cell based on the second set of measurement reports; and
  a comparing circuit configured to compare the current statistics with the reference statistics to enable the detection of a faulty antenna in the first radio base station or the second radio base station.

24. The first radio base station of claim 23, further comprising a transmitting circuit configured to transmit a statistics message to an Operation and Maintenance node, which statistics message comprises the current statistics or the reference statistics or both.

25. The first radio base station of claim 23, further comprising a detecting circuit configured to detect an antenna as a faulty antenna in the event that the current statistics deviate from the reference statistics.

26. The first radio base station of claim 25, further comprising a transmitting circuit configured to transmit a faulty antenna indication to the second radio base station or an Operation and Maintenance node, which faulty antenna indication comprises information indicating a faulty antenna and information associated with the current statistics.

27. The first radio base station of claim 26, wherein said receiver, forming circuit, and comparing circuit are arranged to perform said receiving, forming, and comparing statistics for cell relations between the first cell and a number of second cells, and wherein the transmitting circuit is configured to be triggered to transmit the faulty antenna indication in the event that a faulty antenna is detected for only one cell relation between the first cell and one of the second cells out of the number of second cells.

28. The first radio base station of claim 25, wherein said receiver, forming circuit, and comparing circuit are arranged to perform said receiving, forming, and comparing statistics for cell relations between the first cell and a number of second cells, and wherein the detecting circuit is further configured to detect that the faulty antenna is comprised at the first radio base station in the event that a faulty antenna is detected for cell relations between the first cell and a plurality of second cells out of the number of second cells.

29. The first radio base station of claim 25, further comprising a transmitting circuit configured to transmit an alarm message to an Operation and Maintenance node, which alarm message indicates that the antenna in the first radio base station is a faulty antenna.

30. The first radio base station of claim 25, wherein the detecting circuit is further configured to detect that the antenna, being the faulty antenna, is comprised at the second radio base station in the event that the current statistics indicate a radio coverage of the second cell that is different than a radio coverage of the second cell indicated by the reference statistics.

31. The first radio base station of claim 25, further comprising a receiving circuit configured to receive an external faulty antenna indication from the second radio base station indicating a faulty antenna at the first radio base station, and the detecting circuit is configured to take the received external faulty antenna indication into account when detecting that the antenna is a faulty antenna.

32. The first radio base station of claim 23, wherein the forming circuit is configured to form reference statistics by computing mean values and standard deviation of the first set of measurement reports or to form current statistics by computing mean values and standard deviation of the second set of measurement reports, or both.

33. The first radio base station of claim 23, wherein the reference statistics or current statistics or both indicate a common cell border size or an extended common cell border size, indicating a radio coverage area covered by both the first cell and the second cell.

34. The first radio base station of claim 23, wherein the measurement reports comprise Reference Signal Received Power, Reference Signal Received Quality, Radio Link Failure, or indication of handover.

35. The first radio base station of claim 23, wherein the comparing circuit is configured to pass-band filter the received measurement reports.

36. The first radio base station of claim 23, wherein the received measurement reports indicate handover of the at least one user equipment to the second cell, and wherein the first radio base station further comprises a classifying circuit configured to classify the handovers as non-oscillating handover attempts so that only non-oscillating handover attempts impacts the reference and current statistics.

37. A radio network node for enabling detection of a faulty antenna in a radio communications network in which a first radio base station provides radio coverage in a first cell, and a second radio base station provides radio coverage in a second cell, wherein the radio network node comprises:
   a receiving circuit configured to receive at least one message relating to a cell relation between the first cell and the second cell; and
   a detecting circuit configured to detect that an antenna comprised at the first radio base station or at the second radio base station is a faulty antenna by analyzing the received at least one message.

38. The radio network node of claim 37, wherein the received at least one message comprises a faulty antenna indication, which faulty antenna indication comprises information indicating a faulty antenna at the second radio base station or at the first radio base station.

39. The radio network node of claim 37, further comprising a transmitting circuit that is configured to, when the second radio base station is detected to comprise a faulty antenna, transmit an alarm message to an Operation and Maintenance node, which alarm message indicates that the antenna in the second radio base station is a faulty antenna.

40. The radio network node of claim 37, wherein the radio network node is the second radio base station.

41. The radio network node of claim 37, wherein the radio network node is an Operation and Maintenance node.

42. The radio network node of claim 41, wherein the received at least one message comprises an alarm message, which alarm message indicates that the antenna in the first radio base station or the second radio base station is a faulty antenna.

43. The radio network node of claim 41, wherein the received message comprises a statistics message, which statistics message comprises current statistics of a cell relation between the first cell and the second cell or reference statistics of a cell relation between the first cell and the second cell, or both, and which reference statistics, if any, are formed based on a first set of measurement reports received over a first period of time, and which current statistics, if any, are formed based on a second set of measurement reports received over a second period of time, wherein at least some measurement reports are indicating a cell relation between the first cell and the second cell based on signal strengths measured at the at least one user equipment.

44. The radio network node of claim 41, wherein the receiving circuit is further configured to receive a second message from the second radio base station, which second message is indicating a cell relation between the first cell and the second cell based on signal strengths measured at the at least one user equipment, and the detecting circuit is further configured to detect whether a faulty antenna is comprised in the second radio base station or the first radio base station based on the at least one message and the second message.

* * * * *